UNITED STATES PATENT OFFICE.

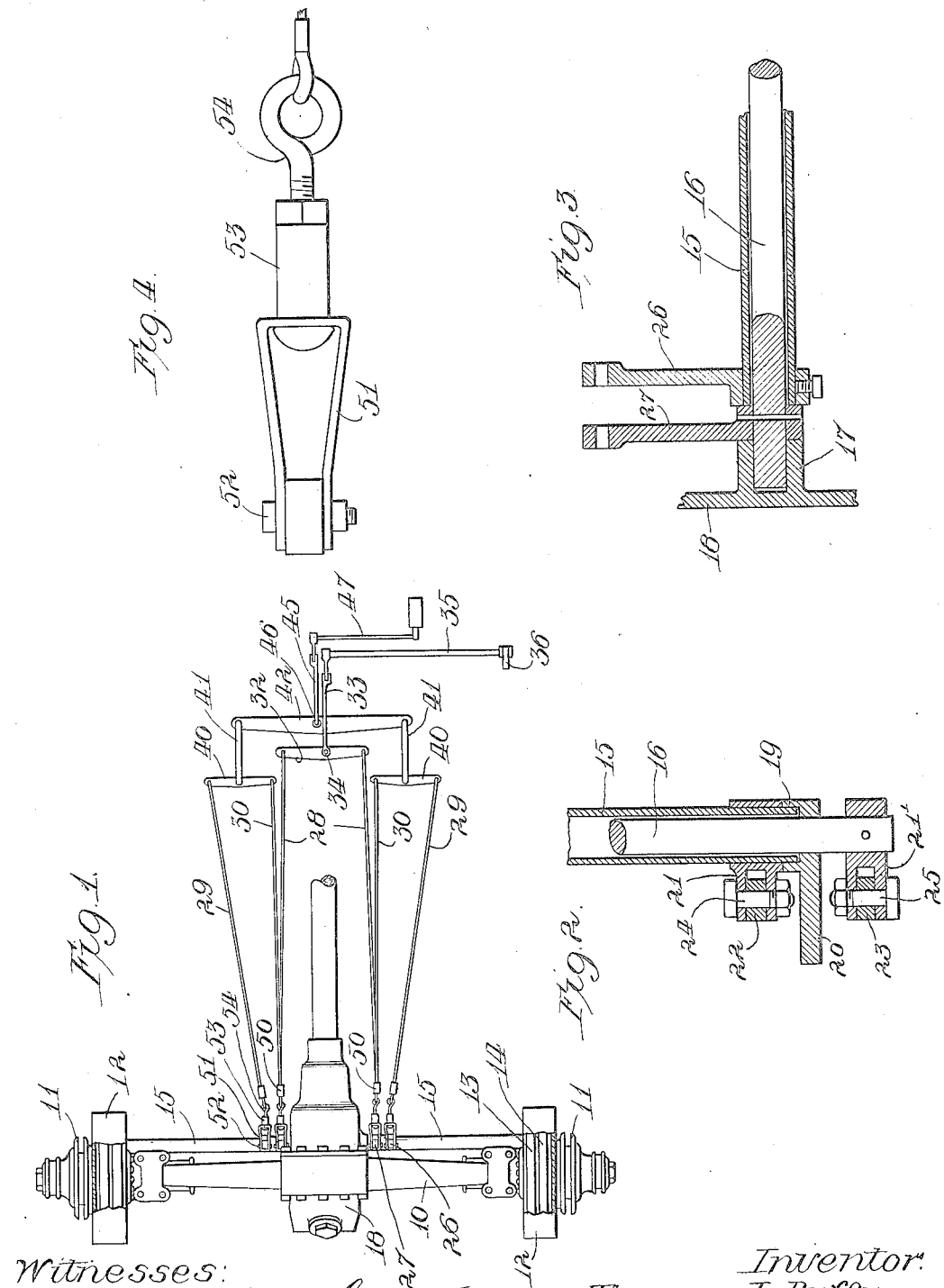

THOMAS I. DUFFY, OF CHICAGO, ILLINOIS.

BRAKE MECHANISM.

1,076,564.

Specification of Letters Patent.

Patented Oct. 21, 1913.

Original application filed June 5, 1912, Serial No. 701,724. Divided and this application filed October 28, 1912. Serial No. 728,218.

*To all whom it may concern:*

Be it known that I, THOMAS I. DUFFY, a citizen of the United States, and a resident of Chicago, in the county of Cook and State of Illinois, have invented new and useful Improvements in Brake Mechanism; and I do hereby declare that the following is a full, clear, and exact description thereof, reference being had to the accompanying drawings, and to the characters of reference marked thereon, which form a part of this specification.

This invention relates to improvements in brake mechanisms, more especially adaptable to automobile constructions and the invention consists in the arrangement and construction of the parts hereinafter described and more particularly pointed out in the appended claims.

The invention refers more specifically to an equalizing mechanism for operating the brake mechanism for automobile and like constructions of that kind in which each rear or driving wheel of the machine is provided with bands or shoes so arranged that one band of each wheel operates in a pair with a band of the other wheel, the construction being such that the operation of one pair of bands produces a service stop and the operation of both pairs produces an emergency stop.

The object of the invention is to provide a simple and effective operating mechanism so constructed and arranged that the mechanism may be operated for a service stop by the use of a single operating lever or pedal and may be as quickly operated for an emergency stop by the use of another single operating lever or brake.

In the drawings:—Figure 1 is a plan view, partly diagrammatic, showing the brake mechanism and operating means therefor. Fig. 2 is a detail section showing the connection of the brake rock shafts with the brake mechanism at the drum. Fig. 3 is a detail section illustrating the inner ends of the brake rock shafts and the actuating arms therefor. Fig. 4 is a detail illustrating the manner of attaching the brake cables to the rock shaft arms.

As shown in the drawings, 10 designates as a whole the rear axle of the vehicle, 11, 11 the wheel hubs thereon and 12, 12 the brake drums carried by the hubs and adapted to coöperate with the brake bands or shoes, 13, 14.

The construction herein shown is adapted for use with the form of brake mechanism shown in my prior application for U. S. Letters Patent, Serial No. 701,724 filed on the 5th day of June, 1912, of which the present application is a division.

15, 16 designate brake actuating rock shafts. There are two shafts at each end of the axle, and one is shown as made hollow to receive the other. The inner brake shaft 16 of each pair is mounted at its inner end in a boss 17 at the side of the rear axle gear case 18 and the outer end of the outer or hollow rock shaft 15 is mounted in a bearing 19 carried by the torque arm 20. The said shafts 15, 16 are provided at their outer ends with rigidly connected arms 21, 21' respectively, which arms are loosely connected to the outer ends of the brake band actuating plungers 22, 23 (in the manner shown in my aforesaid prior application) as by means of the pivot bolts 24, 25. The outer and inner rock shafts 15, 16 are provided at their inner ends with upstanding crank arms 26, 27 which latter are connected to the rear ends of the equalizing cables 28, 29 and 30 that extend forwardly from the axle for connection with suitable levers or pedals. When the said rock shafts are rocked forwardly they act through appropriate brake mechanisms to press the brake bands into frictional engagement with the rim of the brake drum. In the use of the double brake band construction, the outer bands will usually be used for service stops, and for the emergency stops both bands of each brake drum will be simultaneously set, so as to secure full and simultaneous action of both bands. In order to operate said brake bands conveniently and efficiently for service and emergency stops I employ an equalizer connection between the rock shafts 15, 16 and the actuating pedals or levers thereof, which is made as follows: The cables 28, which are attached at their rear ends to the crank arms 27 of the inner rock shafts, are carried forwardly and are attached at their forward ends to the ends of an evener 32 that may be supported on any suitable part of the vehicle frame, not shown. 33 designates a link which is pivotally connected at its rear end at 34 to the evener 32, and is connected at its forward end to a rock shaft 35 that may be operated by a hand lever 36, through which power is applied to act on the inner rock shafts to set the brake bands connected therewith for service stops. The cables 29, 30, of which there is a pair at each side of the device, extend forwardly from two pairs of crank arms 26, 27 of the outer and inner rock shafts, respectively, and the cables of said pairs are connected at their forward ends with eveners 40, one at each side of the evener 32. The two eveners 40 are connected between their ends by links 41 with the ends of an equalizing bar 42. 45 designates a link which extends forwardly from and is pivotally connected at 46 to the middle portion of the equalizing bar 42 and the link 45 is connected at its forward end with a foot pedal actuated rock shaft 47, as herein shown. When pressure is applied to rock the foot pedal actuated shaft 47, the equalizing bar 42 is drawn forwardly which, in turn, acts through the pair of side eveners 40, 40 to rock forwardly both pairs of rock shafts and to thereby simultaneously set both pairs of brake bands. Preferably, and as herein shown, the cables 28, 30 which connect the crank arms of the inner rock shafts with the eveners 40, 32, at each side of the brake mechanism, are made of a single length of cable, said cable being attached at its ends to said eveners and threaded between its ends through the connection to the crank arm of the inner rock shaft. In order to prevent the single length of cable, thus serving as an independent connection to eveners, from slipping at its connection to the rock shaft crank arm, I may apply clamping rings 50 to the looped portions of the cables near their connection with said crank arms. Tension devices are applied to said cables to maintain the same in proper tension, and preferably said tension devices are interposed between the cables and the rock shaft crank arms 26, 27. Such tension device is shown in Fig. 4. It comprises a stirrup 51 that is connected at its rear end to its associated crank arm by a pivot 52 and is provided at its closed forward end with an opening to receive a headed tube or nipple 53. The forward end of said nipple is internally screw-threaded to receive the screw-threaded shank of a screw eye 54, to which the cable is directly attached. The said nipple 53 fits loosely in the stirrup so that it may turn therein, and rotation of said nipple serves, through the screw-threaded connection, to exert the proper tension on the cable.

I claim as my invention:—

1. A brake mechanism comprising two members provided with braking faces, a pair of brake elements applied to each member, actuating means connected to one of the brake elements of each pair to simultaneously set the same, and other actuating means connected to both brake elements of each pair for simultaneously setting all the brake elements, embracing equalizing means between the point of application of power and the two pairs of brake elements.

2. A brake mechanism comprising two members provided with braking faces, a pair of brake elements applied to each member, actuating means connected to one of the brake elements of each pair to simultaneously set the same, and other actuating means connected to both brake elements of each pair for simultaneously setting all the brake elements, embracing an equalizing member connected at one end to the two brake elements of one pair and at its other end to the two brake elements of the other pair, with operating means connected to the equalizing member between the ends of the latter.

3. Brake mechanism comprising two members provided with braking faces, a pair of brake elements applied to each member, actuating means connected to one of the brake elements of each pair to operate them simultaneously, embracing an evener with means to draw it forward, an equalizer bar, with means to draw it forward, and a pair of eveners connected to the ends of the equalizing bar, each of the latter eveners being connected at each end to both of the brake elements of one pair.

4. Brake mechanism comprising two members having braking faces, a pair of brake elements applied to each member, a pair of rock shafts associated with each member, each pair of the rock shafts having means to connect them to the brake elements of the associated pair, each pair of rock shafts being provided at their inner ends with crank arms, an evener connected to corresponding crank arms of each pair of shafts to simultaneously set the corresponding brake elements of both pairs, an equalizing bar, a pair of eveners, each connected to one end of said bar, and connections between each latter eveners and both crank arms of the rock shafts of an associated pair.

In testimony, that I claim the foregoing as my invention I affix my signature in the presence of two witnesses, this 18th day of October, 1912.

THOMAS I. DUFFY

Witnesses:
W. L. HALL,
G. E. DOWLE.